United States Patent [19]

Basel et al.

[11] 4,022,062

[45] May 10, 1977

[54] GAUGE GLASS SHIELD

[75] Inventors: Donald R. Basel, Garfield Heights; Raymond P. Kawolics, Solon, both of Ohio

[73] Assignee: Tomlinson Industries, Inc., Cleveland, Ohio

[22] Filed: May 14, 1975

[21] Appl. No.: 577,547

[52] U.S. Cl. ............................................. 73/325
[51] Int. Cl.² ....................................... G01F 23/02
[58] Field of Search .................. 73/325, 326, 431

[56] References Cited

UNITED STATES PATENTS

| | | | |
|---|---|---|---|
| 1,225,604 | 5/1917 | Ernst ................................. | 73/326 |
| 1,239,304 | 9/1917 | Pocock ............................. | 73/326 |
| 1,354,296 | 9/1920 | Hatfield ............................ | 73/326 |
| 2,083,794 | 6/1937 | Roby ............................... | 73/326 X |
| 2,161,849 | 6/1939 | Bordo ............................. | 73/326 |
| 2,182,749 | 12/1939 | Oestreicher ..................... | 73/325 |
| 3,046,785 | 7/1962 | Au Werter ...................... | 73/325 |

Primary Examiner—Richard C. Queisser
Assistant Examiner—John S. Appleman
Attorney, Agent, or Firm—Fay & Sharpe

[57] ABSTRACT

The specification and drawings disclose a gauge glass assembly including a gauge glass protected by a tubular shield including means for permitting visual observation of the gauge glass. The gauge glass is positioned in a cylindrical receptor which is in flow communication with the liquid whose level is being observed. The shield surrounds the gauge glass and has a length sufficient to enclose the exposed length of gauge glass. At the upper end of the shield an upper nut member is threadedly received on the shield and arranged such that when tightened it applies an axially directed force to drive the glass into the receptor. A lower nut member is positioned about the lower end of the gauge but is threaded to the receptor. Outwardly extending tabs or ears on the shield are engaged by the lower nut such that tightening of the nut drives the shield axially toward the receptor.

9 Claims, 4 Drawing Figures

GAUGE GLASS SHIELD

BACKGROUND AND BRIEF DESCRIPTION OF INVENTION

The subject invention is directed toward the art of gauge glass devices and, more particularly, to an improved arrangement for mounting a gauge glass shield. The invention is especially suited for use in gauge glas shields of the type used in coffee beverage makers, such as urns and percolators, and will be described with reference thereto; however, it will be appreciated that the invention is capable of broader application.

In particular, the invention contemplates the provision of a gauge glass assembly comprising an upwardly open receptor, with a guage glass tube having its lower end positioned in the receptor and extending upwardly therefrom. A tubular shield surrounds the gauge glass member and has a length at least nearly as long as the gauge glass. Means are provided in the shield to permit visual observation of the gauge glass. An upper nut member is threaded on the upper end of the shield member and includes a portion engaged with the upper end of the gauge glass such that tightening of the upper nut member on the shield applies an axial force to the gauge glass to drive it toward the receptor. A lower nut member is carried about the lower end of the shield and threaded to the receptor. Interengaging portions are provided between the second nut member and the shield such that tightening of the lower nut member causes the shield to be driven axially toward the receptor. Preferably, the interengaging portions between the lower nut member and the shield comprise outwardly extending tabs or ears included on the shield and extend outwardly under a flange formed on the lower nut.

According to a somewhat limited aspect of the invention, the tabs are an integral part of the shield and are formed by deforming a portion of the shield. Specifically, the tabs are formed by a staking operation to deform outwardly a portion of the shield tube at the lower end of the elongated opening.

In accordance with a further aspect of the invention, the receptor includes a resilient seal surface which engages the lower end of the gauge glass to provide a fluid seal. Preferably, the seal surface is located such that tightening of the first nut member drives the gauge glass into tight engagement with the sealing surface.

In accordance with another aspect of the present invention, the gauge glass and shield comprise a single tubular member.

Accordingly, a primary object of the invention is the provision of a simplified gauge glass and shield assembly.

Another object is the provision of a gauge glass assembly having a shield member arranged to hold the gauge glass trapped between resilient washers at its opposite ends.

A further object of the invention is the provision of an assembly of the type described wherein the gauge glass and shield are releasably held in position through tabs or ears formed on the shield.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DESCRIPTION OF THE PREFERRED EMBODIMENT

Figure 1:
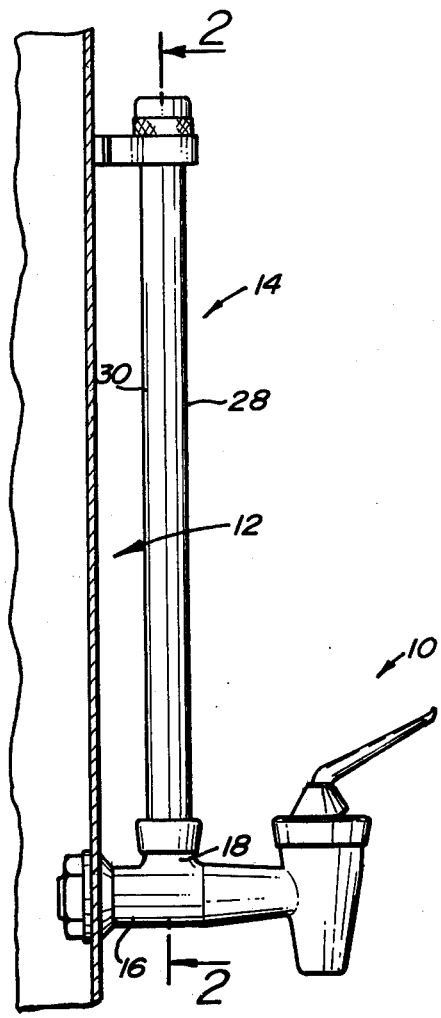
FIG. 1 is a side elevation of a dispensing valve unit incorporating a gauge glass and shield assembly formed in accordance with the subject invention.

Referring more particularly to the drawings wherein the showings are for the purpose of illustrating a preferred embodiment of the invention only and not for the purpose of limiting same, FIG. 1 shows the overall arrangement of a dispensing valve or nozzle assembly 10 mounted on a conventional coffee or beverage maker 12. A gauge glass and shield assembly 14 is associated with the dispensing nozzle or valve assembly 10 and incorporates features of the subject invention. As used herein, the term gauge glass merely refers to a type of visual gauge known in the art and does not refer to or define the type of material employed in the gauge construction.

The structural details of the dispensing valve 10 and the beverage maker 12 form no particular part of the invention and have been illustrated merely by way of background to show one possible environment in which the inventive gauge glass and shield assembly 14 can be used. Preferably, the dispensing valve assembly is a relatively conventional cam-actuated type unit such as, for example, shown in U.S. Pat. Nos. 3,104,089 and 3,207,472. It should, of course, be recognized that the assembly 14 could be used with other types of valves and/or in other environments.

Figure 2:
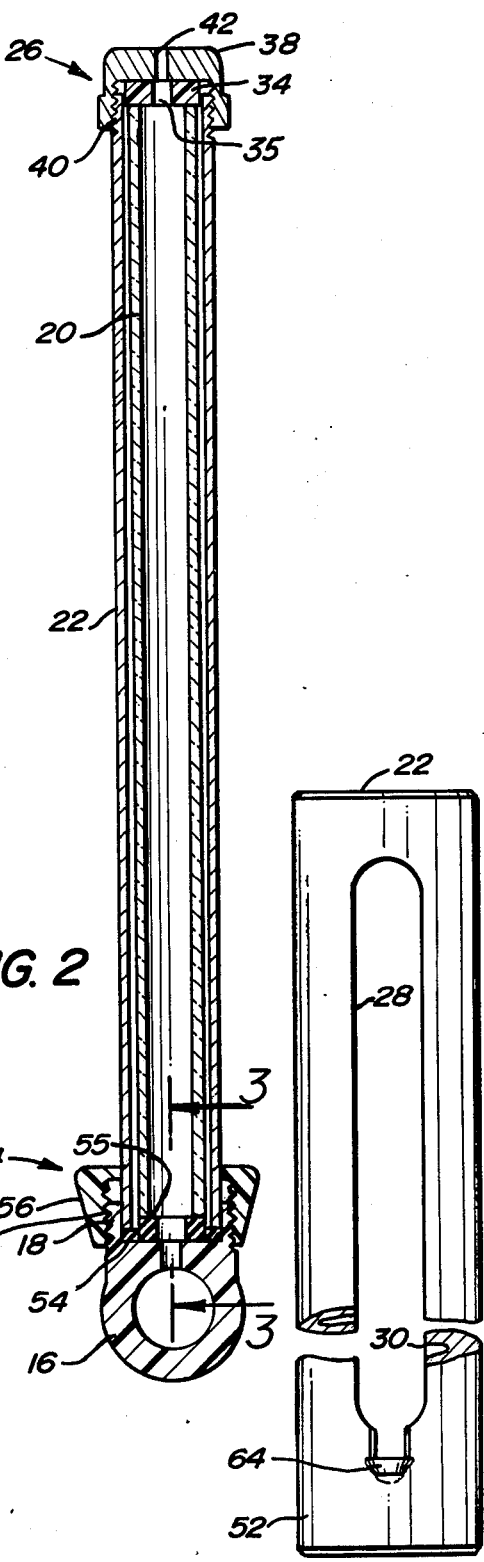
FIG. 2 is a vertical cross-sectional view through the gauge glass and shield assembly taken along line 2—2 of FIG. 1.
Figure 3:
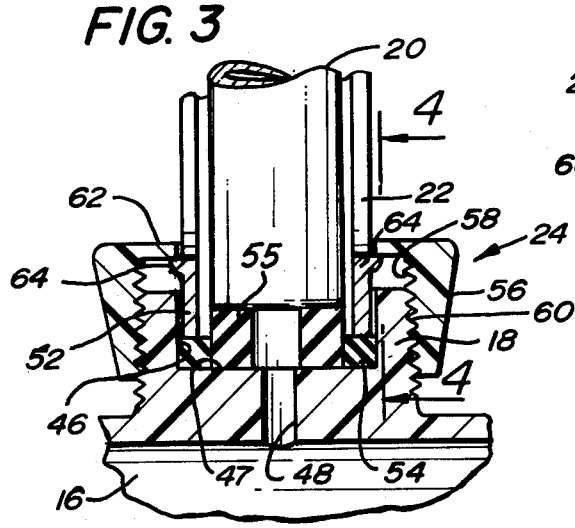
FIG. 3 is a greatly enlarged cross-sectional view taken on line 3—3 of FIG. 2; and, FIG. 4 is a view taken on line 4—4 of FIG. 3 to show the shield tube and the connecting tabs in detail.

In the subject embodiment, the gauge glass and shield assembly 14 is arranged so as to give a continuous indication of the level of fluid within the maker 12. As can be seen, the assembly 14 is mounted from the inlet tube 16 of valve assembly 10. The assembly 14 extends generally vertically upwardly from tube 16 and, as best shown in FIGS. 2 and 3, is directly connected to an externally threaded stub tube or tube section 18 formed integrally with tube 16. Broadly, the gauge glass and shield assembly 14 includes a tubular, transparent gauge tube 20 positioned within a comparatively thin tubular shield member 22. In the preferred arrangement here under discussion, gauge tube 20 comprises a glass tube and shield member 22 formed from aluminum or the like metal; however, other materials may also be satisfactorily and advantageously employed without departing from the intent and scope of the present invention. For example, gauge tube 20 and shield member 22 could be constructed of plastic or other materials. The gauge glass tube 20 and the shield 22 are joined at their lower end to the tube 18 by a lower fitting member 24. At the upper end, a fitting 26 is provided for reasons which will subsequently be described in detail.

The gauge glass tube 20 is, as best shown in FIGS. 2 or 3, merely a cylindrical, hollow tube formed from a transparent material which, in this instance, is glass. The ends of the tube 20 are preferably slightly rounded. As shown, the gauge tube 20 is arranged to be concentrically received within the shield member 22. In the subject embodiment, shield member 22 is formed from a fairly thin aluminum tube and is provided with longitudinally extending milled slots 28 and 30 formed on diagonally opposite sides of the tube (see FIG. 4). The slots 28 and 30 permit visual observation of the gauge tube 20 so that the level of liquid therein can be readily ascertained. The slots 28, 30 are sized so that the major portion of the gauge tube 20 is fully protected by the shield tube 22. Of course, in the event that shield member 22 is constructed from plastic or other transparent or transluscent material, slots 28, 30 are not required.

Assembly 26 is mounted at the upper end of the shield member 22 and serves to generally close the end of the gauge glass 20 and to apply a downwardly directed force to the gauge glass for reasons which will subsequently be described. As shown, the assembly 26 includes a resilient seal washer 34 having a small center opening 36. An internally threaded cap or upper nut member 38 is received on the threaded end portion 40 of the shield 22 and as can be seen, the cap or upper nut member 38 is provided with a center opening 42. In the assembled condition, the openings 36 and 42 are in alignment so that the interior of the gauge tube 20 is at atmospheric pressure. This permits fluid from within the beverage maker 12 to flow through tube 60 and upwardly into the guage glass 20 until the level of the fluid within the gauge glass 20 corresponds to the level of the fluid within the beverage maker.

By tightening cap member 38, a direct downward force can be applied to the gauge tube 20. Additionally, tightening of the cap member 38 and the compression of the resilient seal washer 34 tends to hold the gauge glass in position to prevent it from having undesired movements within the shield member 22.

At its lower end (see FIG. 3) the tubular shield member and gauge glass assembly 14 is releasably mounted to the stub tube 18 by the lower assembly 24. As shown, the stub tube 18 includes an internal counterbore 46 which terminates in a bottom wall 47 having a small center opening 48. The counterbore 46 is sized so as to closely receive the lower end 52 of the shield member 22. Additionally, a resilient flat gasket ring or seal washer 54 is removably received within the bore 50 and adapted to engage the lower end of the shield member 22. A second resilient gasket ring or seal washer 55 is positioned to be engaged by the lower end of the gauge glass tube 20. It should be appreciated that a single gasket could be used if desired.

The gauge glass and shield assembly 14 is adjustably held in its assembled position within bore 46 at lower end 52 by the lower nut member 56. As can be seen, threads 58 are formed internally of the lower end of lower nut member 56 and mate with external threads 60 formed about the upper end of the stub tube 18. The upper end of the lower nut member 56 includes an inwardly extending circumferential flange 62 which is received over outwardly extending tabs or ears 64, shown only in FIG. 3, carried on the shield member 22. It is, of course, apparent that tightening of the lower nut member 56 on the upper end of stub tube 18 causes the shield tube to be pulled down tightly into engagement with the seal washer 54. Thereafter, tightening of the cap or upper nut member 38 compresses the upper gasket or seal member 34 to drive the gauge tube 20 into tight sealing engagement with the lower seal washer 55. Consequently, the gauge tube 20 is resiliently held between the gaskets 34 and 55.

Figure 4:

According to one aspect of the subject invention, the tabs or ears 64 of the shield tube 22 are formed integrally from the material of shield member 22, particularly when that member is constructed from aluminum or a similar metal. In particular, as best seen in FIG. 4, the tabs 64 are formed by a staking operation which merely drives some of the parent tube metal downwardly from the lower end of each of the longitudinal grooves 28, 30. When shield member 22 is constructed from plastic or the like, the tabs or ears 64 may be affixed to the shield member by an adhesive material. To this end and in such a construction, the tabs or ears 64 shown in FIG. 3 may be conveniently replaced by an annular ring received over the outside surface of shield member 22 and adhesively affixed thereto so as to define an outwardly extending circumferential locking shoulder.

It has also been found possible to combine gauge tube 20 and shield member 22 into a single tubular member. In this structure, the shield member is constructed from a transparent or translucent plastic or similar non-breakable material and performs as both the gauge tube and shield member. The remainder of the construction remains substantially identical to that hereinabove discussed except that seal washers 54, 55 may be conveniently replaced by a single flat gasket ring having an outside dimension equal to that of seal washer 54 and an inside dimension equal to that of seal washer 55. In this arrangement, tabs or ears 64 or an annular ring are adhesively affixed to the shield member as described above. Accordingly, in this modification, tightening the combined shield member and gauge glass into position on stub tube 18 is effected entirely through tightening of the lower nut member 56 on the upper end of stub tube 18.

Thus, as can be seen, a highly simplified method of mounting and protecting a gauge glass is provided. Obviously, many variations within the scope of the claims will be apparent to others and it is our intention to include such modifications as part of our invention.

Having thus described our invention, we now claim:

1. A gauge glass assembly comprising:
    a mounting member having an upwardly open receptor bore with a bottom wall;
    a tubular member defining a gauge glass portion on the inside thereof having a bottom end positioned in said bore and extending upwardly therefrom and terminating in an upper end, said tubular member including at least one elongated axially extending opening therein to permit visual observation of the gauge glass portion throughout a substantial portion of its length, said opening having a lower edge which is spaced adjacent said bottom end and outwardly of said receptor bore, said tubular member including an integrally formed outwardly extending flange defined by at least one outwardly extending tab comprised of a portion of the parent material of said shield member deformed outwardly from adjacent said opening lower edge; and,
    a lower nut member carried about the lower end of the tubular member and threaded to said mounting member, said lower nut member including an inwardly extending flange area adapted to engage the upper surface of said at least one outwardly extending tab such that threaded advancement of said lower nut on said mounting member causes the tubular member to be driven axially toward the receptor bottom wall.

2. The assembly as defined in claim 1 wherein a gasket member is positioned between said receptor and the bottom end of said tubular member.

3. The assembly as defined in claim 1 wherein an upper nut member is received on the uppermost end of said tubular member.

4. The assembly as defined in claim 1 further including a separate transparent gauge tube member having its lower end positioned in said bore and extending upwardly therefrom, said tubular member defining a gauge tube shield disposed about and extending generally coextensive with said gauge tube, said assembly further including an upper nut member threaded on the upper end of said shield and including a portion positioned such that tightening of said upper nut member on said shield applies an axially downward force to said gauge tube to drive it toward said receptor bore.

5. The assembly as defined in claim 4 wherein said at least one opening comprises a pair of elongated axially extending openings with each of said openings having a lower edge spaced adjacent said tubular member bottom end and outwardly of said receptor bore, said tubular member further including an integrally formed outwardly extending tab adjacent the lower edge of each of said openings.

6. The assembly as defined in claim 5 wherein said pair of openings are located on diametrically opposite sides of said shield.

7. The assembly as defined in claim 4 including resilient gaskets located adjacent each end of said gauge tube member, one of said gaskets being disposed between the uppermost end of said gauge tube member and said upper nut with another of said gaskets being disposed between the lowermost end of said gauge tube member and the bottom wall of said receptor bore, said gaskets including openings for permitting fluid communication with the interior of said gauge tube member.

8. The assembly as defined in claim 4 wherein a first gasket member is positioned at least between said receptor bottom wall and the lower end of said gauge tube member, said first gasket member including an opening for permitting fluid communication with the interior of said gauge tube member.

9. The assembly as defined in claim 8 further including a second gasket member dimensioned to be closely received in said receptor bore between the bottom end of said shield and the bottom wall of said receptor bore, said second gasket member including a central opening dimensioned to permit said first gasket member to be closely received therein.

* * * * *